(12) United States Patent
Kumagai

(10) Patent No.: US 10,424,907 B2
(45) Date of Patent: Sep. 24, 2019

(54) ELECTRICAL JUNCTION BOX

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Tooru Kumagai, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 146 days.

(21) Appl. No.: 15/541,943

(22) PCT Filed: Jan. 8, 2016

(86) PCT No.: PCT/JP2016/050427
§ 371 (c)(1),
(2) Date: Jul. 6, 2017

(87) PCT Pub. No.: WO2016/111342
PCT Pub. Date: Jul. 14, 2016

(65) Prior Publication Data
US 2017/0365991 A1      Dec. 21, 2017

(30) Foreign Application Priority Data
Jan. 8, 2015  (JP) .................................. 2015-002100

(51) Int. Cl.
*H02H 3/00* (2006.01)
*H02H 1/00* (2006.01)
(Continued)

(52) U.S. Cl.
CPC ........... *H02H 1/0007* (2013.01); *B60R 16/02* (2013.01); *B60R 16/0238* (2013.01); *H02G 3/16* (2013.01);
(Continued)

(58) Field of Classification Search
None
See application file for complete search history.

(56) References Cited

U.S. PATENT DOCUMENTS 6,424,161 B2 * 7/2002 Damon ................... H01L 22/34
257/E23.147
7,474,106 B2 * 1/2009 Kanno ................. G11C 17/143
324/550
(Continued)

FOREIGN PATENT DOCUMENTS

| JP | H10094156 A | 4/1998 |
|----|-------------|--------|
| JP | 2000260296 A | 9/2000 |

(Continued)

OTHER PUBLICATIONS

Search Report for PCT/JP2016/050427, dated Mar. 22, 2016.

*Primary Examiner* — Stephen W Jackson
(74) *Attorney, Agent, or Firm* — Honigman LLP

(57) ABSTRACT

An electrical junction box has a switch connected between a first connection terminal and a second connection terminal to which a fuse is mounted, and a control circuit configured to perform opening/closing control of the switch, has a storage unit for storing a standard resistance value in an initial state of the fuse and an amount of change in a resistance value of the fuse over time, and detects a first terminal voltage at the first connection terminal and a second terminal voltage at the second connection terminal. The control circuit opens the switch at a time of startup based on a control signal, calculates the resistance value of the fuse, calculates a reference resistance value, determines whether (Continued)

the fuse is correct by comparing the calculated resistance value of the fuse with the calculated reference resistance value, and outputs a first error signal if the fuse is incorrect.

11 Claims, 3 Drawing Sheets

(51) Int. Cl.
    *B60R 16/02*         (2006.01)
    *H02G 3/16*         (2006.01)
    *H02H 3/08*         (2006.01)
    *B60R 16/023*       (2006.01)
    *H02H 3/04*         (2006.01)

(52) U.S. Cl.
    CPC ............ *H02H 3/044* (2013.01); *H02H 3/046* (2013.01); *H02H 3/08* (2013.01)

(56) References Cited

U.S. PATENT DOCUMENTS

| | | | |
|---|---|---|---|
| 8,686,596 B2 * | 4/2014 | Huss | H01H 85/32 |
| | | | 307/117 |
| 10,180,447 B2 * | 1/2019 | Kothekar | H02H 3/046 |
| 2016/0105112 A1 | 4/2016 | Ukegawa et al. | |

FOREIGN PATENT DOCUMENTS

| | | |
|---|---|---|
| JP | 2008193776 A | 8/2008 |
| JP | 2014177208 A | 9/2014 |
| WO | 2014207812 A1 | 12/2014 |

\* cited by examiner

ELECTRICAL JUNCTION BOX

CROSS-REFERENCE TO RELATED APPLICATIONS

This application is the U.S. national stage of PCT/JP2016/050427 filed Jan. 8, 2016, which claims priority of Japanese Patent Application No. JP 2015-002100 filed Jan. 8, 2015.

TECHNICAL FIELD

The present invention relates to an electrical junction box.

BACKGROUND

Conventionally, vehicles are provided with an electrical junction box arranged between a battery and various loads. Fuses that blow when an overcurrent flows therethrough to protect the loads are arranged in the electrical junction box (e.g., see JP 10-94156A).

Fuses break due to factors such as deterioration caused by aging. Broken fuses are replaced with a new fuse by an operator such as a user. Since various persons such as the user are able to easily access the fuse, a fuse having an inappropriate capacity may be accidentally mounted. When an incorrect fuse is mounted, the loads can no longer be protected, and there is a risk of causing a drop in reliability.

An object of the present invention is to provide an electrical junction box that suppresses a drop of reliability.

SUMMARY

According to one aspect of the present invention, an electrical junction box has a switch connected between a first connection terminal and a second connection terminal to which a fuse is mounted, and a control circuit that is configured to perform opening/closing control of the switch, has a storage unit for storing a standard resistance value in an initial state of the fuse and an amount of change in a resistance value of the fuse over time, and detects a first terminal voltage at the first connection terminal and a second terminal voltage at the second connection terminal. The control circuit opens the switch at a time of startup based on a control signal, calculates the resistance value of the fuse based on the first terminal voltage and the second terminal voltage, calculates a reference resistance value based on the standard resistance value and the amount of change, determines whether the fuse is correct by comparing the calculated resistance value of the fuse with the calculated reference resistance value, and outputs a first error signal if it is determined that the fuse is incorrect.

According to this configuration, the resistance value of the fuse that is connected to the first connection terminal and the second connection terminal will be a value that is based on the capacity and ageing characteristics of the fuse. The resistance value of the mounted fuse is detected based on the difference between the first terminal voltage of the first connection terminal and the second terminal voltage of the second connection terminal. Accordingly, at the time of startup, it is determined whether the correct fuse is mounted, by comparing the resistance value of the fuse calculated based on the first terminal voltage and the second terminal voltage with a reference resistance value calculated based on the standard resistance value and the amount of change. A fuse capacity error can be notified, by outputting the first error signal in the case where it is determined that a fuse of incorrect capacity is mounted.

In the electrical junction box, preferably the control circuit determines whether the fuse is deteriorated by comparing the calculated resistance value of the fuse with the calculated reference resistance value, and outputs a second error signal according to a result of the determination.

According to this configuration, fuse deterioration can be notified, by outputting the second error signal in the case where the fuse has deteriorated due to aging.

In the electrical junction box, preferably the control circuit determines a state of the fuse based on the first terminal voltage and the second terminal voltage, and outputs a third error signal and closes the switch if it is determined that the fuse is broken.

According to this configuration, fuse breakage can be notified, by outputting the third error signal in the case where it is determined that the fuse is broken. Operation of the load that is connected to the fuse can then be made possible, by closing the switch connected in parallel with the fuse.

In the electrical junction box, preferably the control circuit closes the switch if it is determined that the fuse is not broken, and monitors the state of the fuse based on the first terminal voltage and the second terminal voltage, and, if an overcurrent that flows through the fuse is detected, opens the switch to blow the fuse using the overcurrent, and outputs a fourth error signal.

According to this configuration, all of the overcurrent flows through the fuse, as a result of opening the switch connected in parallel with the fuse in the case where overcurrent is detected. The fuse is thereby blown and the load is protected from the overcurrent. The blown fuse can then be easily specified, using the fourth error signal that is output.

Preferably the electrical junction box has a current detection unit that detects a current in wiring between the fuse and a power source, and the control circuit determines the state of the fuse based on the first terminal voltage, the second terminal voltage, and a current value detected by the current detection unit.

According to this configuration, the current that flows through the fuse can be more accurately detected using the current detection unit.

Advantageous Effects of Invention

According to the electrical junction box of the present invention, a drop in reliability can be suppressed.

DESCRIPTION OF EMBODIMENTS

Figure 1:
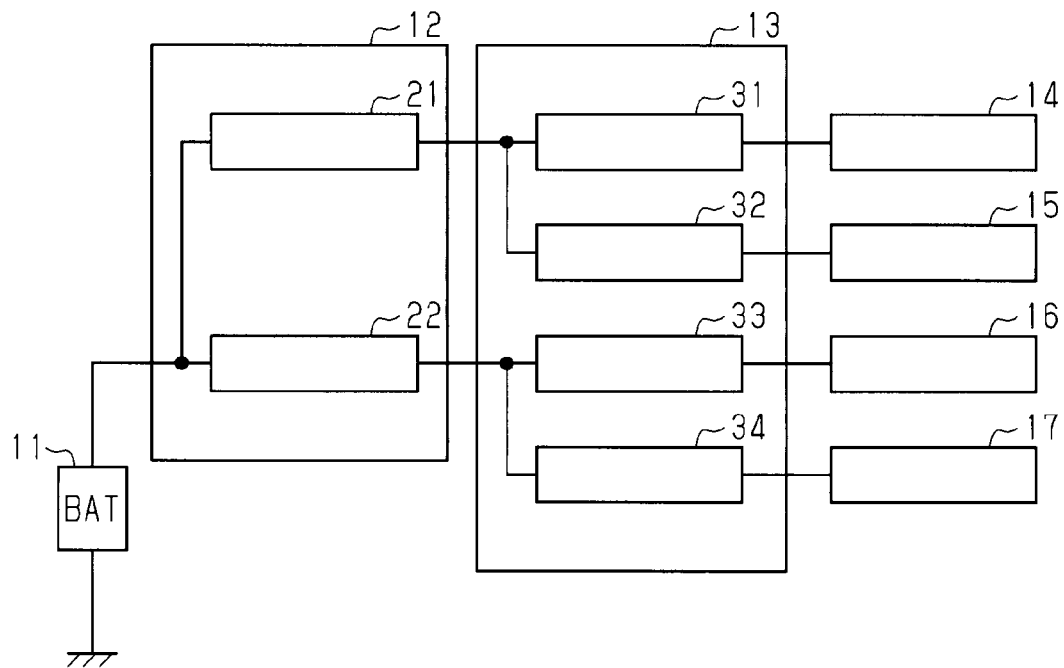
FIG. 1 is a schematic configuration diagram of a power source apparatus of one embodiment.

Hereinafter, one embodiment of the present invention will be described. As shown in FIG. 1, the power of a battery (BAT) 11 (power source) is supplied to a plurality (four in FIG. 1) of loads 14 to 17 via fuse boxes (electrical junction boxes) 12 and 13.

The fuse box 12 is provided with two fuses 21 and 22 that depend on a supply system, for example. The fuses 21 and 22 are detachably mounted to a connection terminal (illustration omitted) arranged in the fuse box 12, for example. The fuse 21 corresponds to the loads 14 and 15 which are IG (Ignition) related, for example. The fuse 22 corresponds to the loads 16 and 17 which are ACC (Accessory) related, for example. The power of the battery 11 is branched within the fuse box 12, according to the power system, and output via the fuses 21 and 22.

The fuse box 13 is provided with a plurality (four in FIG. 1) of fuses 31 to 34. Each of the fuses 31 to 34 is detachably mounted to a connection terminal (illustration omitted) arranged in the fuse box 13, for example. Power that is supplied via the fuse 21 is branched within the fuse box 13, and respectively supplied to the loads 14 and 15 via the fuses 31 and 32. Also, power supplied via the fuse 22 is branched within the fuse box 13, and respectively supplied to the loads 16 and 17 via the fuses 33 and 34.

As an example, the load 14 is an electrical load required in running a vehicle, such as an engine ignition apparatus, a brake apparatus, a power steering apparatus or a control apparatus (e.g., ECU) that controls these apparatuses. The load 15 is an electrical load such as an air-conditioner. The loads 16 and 17 are electrical loads such as a radio or similar audio apparatus, a meter or similar display unit, for example.

Figure 2:
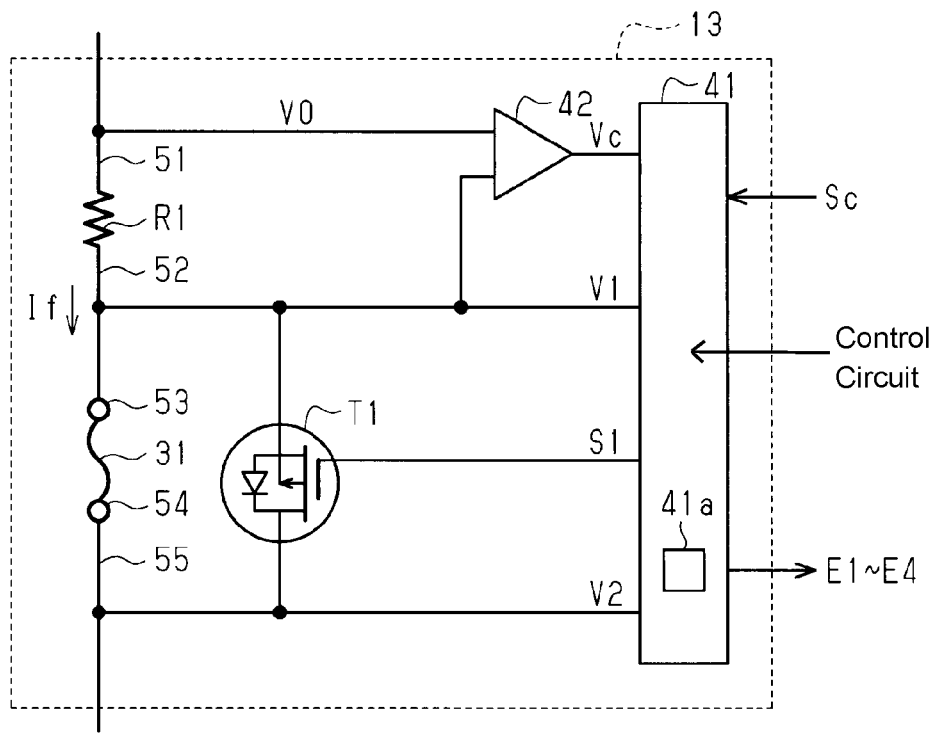
FIG. 2 is a schematic configuration diagram of an electrical junction box of one embodiment.
Figure 3B:
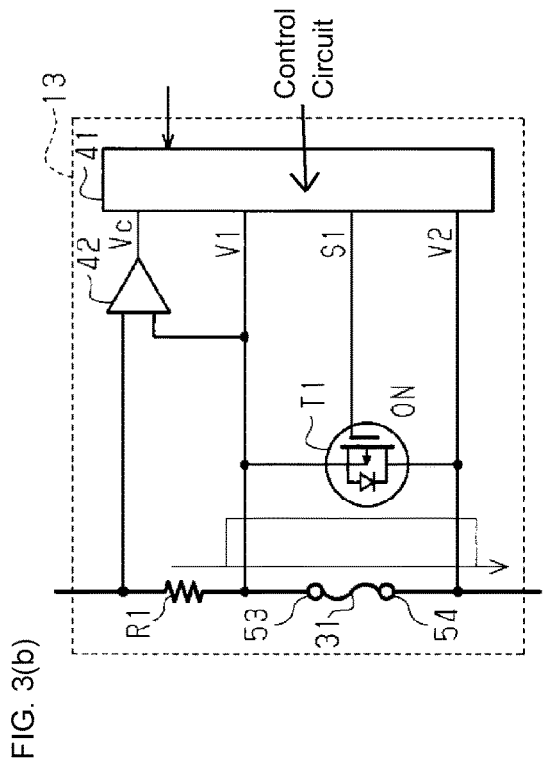
FIGS. 3(*a*) to (*d*) are illustrative diagrams of the operations of the electrical junction box of FIG. 2.
Figure 3D:
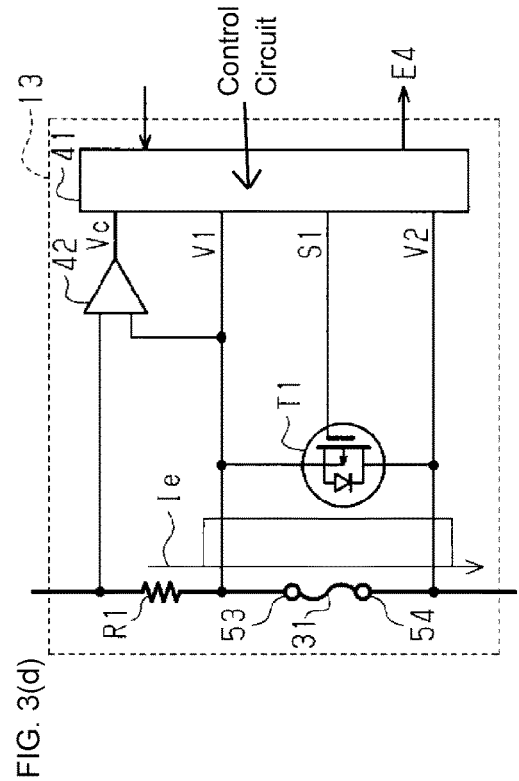
Figure 3A:
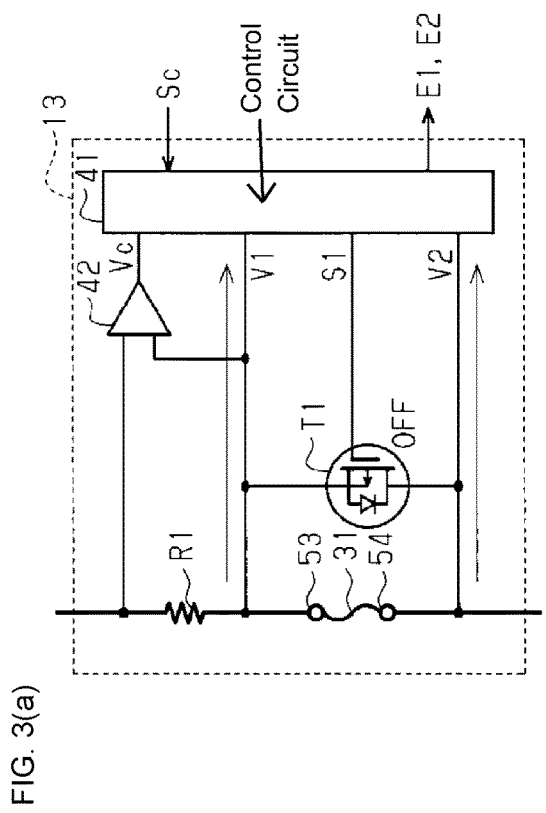
Figure 3C:
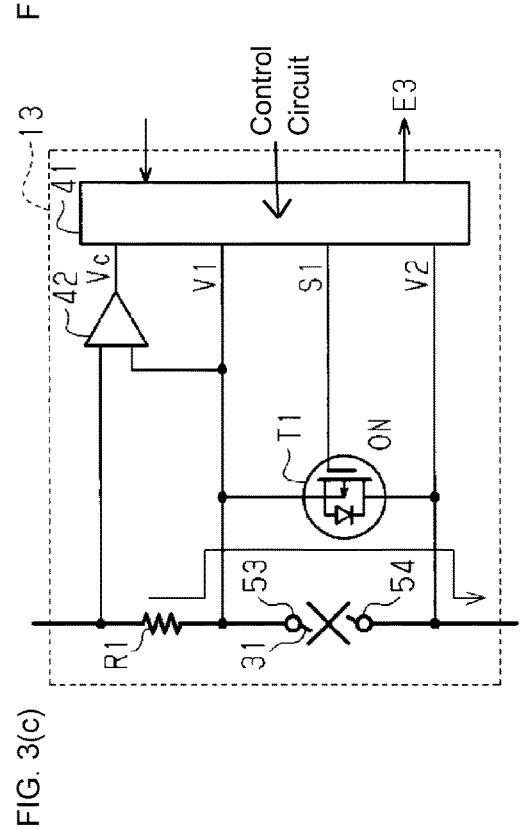

As shown in FIG. 2, the fuse box 13 has a control circuit 41 corresponding to the fuse 31, a transistor T1 serving as a switch, and a resistor R1 and an operational amplifier (op-amp) 42 serving as a current detection unit. FIG. 2 is a schematic view of the fuse box 13, with members (resistors, etc.) for current restriction, voltage division, pull-up/down and the like having been omitted.

Wiring 51 transmits power from the battery 11 shown in FIG. 1. This wiring 51 is connected to a first terminal of the resistor R1, and a second terminal of the resistor R1 is connected to a connection terminal 53 via wiring 52. The fuse 31 is installed in the connection terminals 53 and 54. The connection terminal 54 is connected to the load 14 shown in FIG. 1 via wiring 55.

The transistor T1 is a field-effect transistor (FET), for example. The transistor T1 is connected in parallel with the fuse 31. That is, a first terminal (e.g., source terminal) of the transistor T1 is connected to the connection terminal 53, and a second terminal (e.g., the drain terminal) of the transistor T1 is connected to the connection terminal 54. A control terminal (gate terminal) of the transistor T1 is connected to the control circuit 41, and a control signal S1 is supplied from the control circuit 41. The transistor T1 is turned on/off in response to the control signal S1.

The control circuit 41 is connected to the connection terminals 53 and 54. Terminal voltages V1 and V2 at the connection terminals 53 and 54 are input to the control circuit 41. The control circuit 41 determines a state of the fuse 31, based on the terminal voltages V1 and V2. The control circuit 41 then generates the control signal S1 according to the state of the fuse 31, and controls the transistor T1.

The two input terminals of the op-amp 42 are respectively connected to the two terminals of the resistor R1. The op-amp 42 outputs a detection signal Vc that depends on the difference between voltages V0 and V1 of the two terminals of the resistor R1. The resistor R1 is a shunt resistor, and is provided in order to detect the amount of current that flows through the resistor R1, or in other words, the amount of current that flows through the fuse 31. The op-amp 42 outputs a detection signal Vc of a voltage acquired by amplifying the voltage difference between the two terminals of the resistor R1.

The control circuit 41 is a microcomputer including a central processing unit (CPU) and peripheral circuits such as an AD (analog-digital) conversion circuit, for example. A control signal Sc is supplied to the control circuit 41. The control signal Sc includes an ACC signal and an IG signal that depends on operation of a starter switch such as an IG switch. The control circuit 41 obtains digital values (terminal voltage values) acquired by AD conversion of the voltages of the connection terminals 53 and 54 to which the fuse 31 is mounted. Also, the control circuit 41 obtains a digital value (current value T0 acquired by AD conversion of the detection signal Vc of the op-amp 42. The control circuit 41 then generates the control signal S1 that is supplied to the control terminal of the transistor T1, based on the values of the terminal voltages V1 and V2, the current value If and the control signal Sc. In the following description, the values of the terminal voltages V1 and V2 may be described simply as the terminal voltages V1 and V2.

The control circuit 41 determines the state of the fuse 31. The control circuit 41 then controls the transistor T1 based on the state of the fuse 31. Also, the control circuit 41 outputs error signals E1 to E4 based on the state of the fuse 31.

Actions based on processing by the control circuit 41 will be described with reference to FIG. 3. Some of the referential signs are omitted in FIG. 3.

At Time of Startup

As shown in (a) of FIG. 3, the control circuit 41 turns off the transistor T1 at the time of starting up the vehicle, based on the control signal Sc. The control circuit 41 then detects the state of the fuse 31. The control circuit 41 determines whether the fuse 31 is broken, based on the two terminal voltages V1 and V2. In the case where the fuse 31 is not broken, a voltage difference occurs between the two terminal voltages V1 and V2, according to the resistance value of the fuse 31. Characteristic values of the fuse 31 are stored in a memory 41a of the control circuit 41. The characteristic values stored in the memory 41a include the resistance value (standard resistance value) of the fuse 31 at the time of shipment and the amount of change in the resistance value over time. The fuse expands as a result of heat generation due to current flowing therethrough and contracts due to a drop in temperature after the vehicle stops, for example. The fuse plastically deforms due to repetition of such expansion and contraction, and the resistance value rises.

The control circuit 41 measures elapsed time (e.g., elapsed time from the time of shipment). The control circuit 41 calculates the resistance value (determination resistance value) of the fuse 31, based on the current value and the voltage difference. Also, the control circuit 41 calculates a resistance value (reference resistance value) for use in determination, based on the standard resistance value and the amount of change stored in the memory 41a and the elapsed time. The control circuit 41 then compares the reference resistance value with the determination resistance value, and determines the state of the fuse 31.

In the case where the difference between the determination resistance value and the reference resistance value is large, such as in the case where the difference between the determination resistance value and the reference resistance value exceeds a tolerance range set with consideration for variation in the resistance value of the correct fuse 31, for example, the control circuit 41 determines that the capacity of the mounted fuse is not appropriate, or in other words, that the incorrect fuse is inserted (capacity error). The control circuit 41 then outputs the error signal E1 indicating incorrect insertion. A warning is issued based on this error signal E1. The warning is warning display on the instrument panel or illumination of a warning lamp, for example. For example, the apparatus (e.g., control apparatus (ECU) for controlling the instrument panel) that receives the error signal E1 performs display indicating incorrect insertion of fuse.

In the case where the difference between the determination resistance value and the reference resistance value is small, such as in the case where the determination resistance value is within the tolerance range, for example, the control circuit 41 determines that the fuse 31 is deteriorated. The control circuit 41 then outputs the error signal E2 indicating deterioration of the fuse 31. The apparatus that receives this error signal E2 performs display notifying deterioration (e.g., "the fuse is deteriorated") to the user or the like.

At Normal Time

As shown in (b) of FIG. 3, in the case where it is determined that the fuse 31 is normal, the control circuit 41 turns on the transistor T1. Power is thereby supplied to the load 14 shown in FIG. 1 via the fuse 31 and the turned-on transistor T1 shown in (b). The control circuit 41 then monitors the fuse 31, based on the terminal voltages V1 and V2 and the current value If obtained from the detection signal Vc.

At Time of Broken Fuse

As shown in (c) of FIG. 3, in the case where the fuse 31 is broken in the determination at the time of startup, the control circuit 41 outputs the error signal E3 at a predetermined level (e.g., H level). The apparatus that receives this error signal E3 displays that the fuse 31 is broken. Also, the control circuit 41 sets a flag (breakage flag) of the memory 41a, based on the breakage determination of the fuse 31. The control circuit 41 then turns on the transistor T1 using the control signal S1. Power is thus supplied to the load 14 shown in FIG. 1 via the turned-on transistor T1. The control circuit 41 thereby enables the vehicle to be driven to a dealer or the like. The dealer or the like can thereby quickly replace the broken fuse 31 with a new fuse.

The control circuit 41 determines whether the fuse 31 is broken, at the time of startup. When it is determined that the fuse 31 is normal, the control circuit 41 resets the elapsed time for this fuse 31, based on the set breakage flag. The elapsed time of the fuse 31 after replacement thereby becomes measurable. Also, the control circuit 41 clears the breakage flag.

Since the transistor T1 is on in the case where the fuse 31 breaks after the engine is started, power supply to the load 14 shown in FIG. 1 is continued. When the engine stops and then restarts, the control circuit 41 determines that the fuse 31 is broken, and outputs the error signal E3 indicating this, as abovementioned.

At Time of Overcurrent Detection (d) of FIG. 3 shows the case where an overcurrent Ie flows through the fuse 31. The control circuit 41 compares the current value If obtained from the detection signal Vc with a threshold value stored in the memory 41a. The threshold value is set based on the maximum value (the maximum current) of the current amount in the load 14 (see FIG. 1) to which power is supplied via the fuse 31.

The control circuit 41, in the case where the detected current value If is smaller than the threshold value, determines that the current that flows through the fuse 31 is in a normal range.

The control circuit 41, when the detected current value If is greater than or equal to the threshold value, determines that the overcurrent Ie is flowing through the fuse 31. In the case of an overcurrent, the control circuit 41 turns off the transistor T1 based on the control signal Sc. The fuse 31 is thus blown by the overcurrent Ie. The fuse 31 blows as a result of the control circuit 41 turning the transistor T1 off after detecting the overcurrent Ie, and, and the load 14 (see FIG. 1) is protected.

The control circuit 41 then outputs the error signal E4 indicating the overcurrent Ie. The apparatus that receives this error signal E4 displays that the fuse 31 has blown. The user or the like is thereby able to easily recognize the blown fuse.

As abovementioned, the present embodiment achieves the following effects.

(1) The control circuit 41 of the fuse box 13 has the memory 41a that stores a standard resistance value in the initial state of the fuse 31 and the amount of change in the resistance value of the fuse 31 over time. The control circuit 41 detects the first terminal voltage V1 at the first connection terminal 53 and the second terminal voltage V2 at the second connection terminal 54, and performs opening/closing control of the transistor T1.

The control circuit 41 turns off the transistor T1 at the time of startup based on the control signal Sc, and calculates the resistance value of the fuse 31 based on the first terminal voltage V1 and the second terminal voltage V2. The control circuit 41 determines whether the fuse 31 is correct by comparing the reference resistance value calculated based on the standard resistance value and the amount of change with the calculated resistance value of the fuse 31. The control circuit 41 outputs the first error signal E1 in the case where it is determined that the fuse 31 is incorrect.

The resistance value of the fuse 31 that is connected to the first connection terminal 53 and the second connection terminal 54 will be a value that is based on the capacity and ageing characteristics of the fuse 31. The resistance value of the mounted fuse 31 is detected based on the difference between the first terminal voltage V1 of the first connection terminal 53 and the second terminal voltage V2 of the second connection terminal 54. Accordingly, at the time of startup, it is determined whether the correct fuse is mounted 31, by comparing the resistance value of the fuse 31 calculated based on the first terminal voltage V1 and the second terminal voltage V2 with the reference resistance value calculated based on the standard resistance value and the amount of change. A capacity error of the fuse 31 can be notified, by outputting the first error signal E1 in the case where it is determined that a fuse 31 of incorrect capacity is mounted.

(2) The control circuit 41 determines whether the fuse 31 is deteriorated by comparing the reference resistance value with the calculated resistance value of the fuse 31, and outputs the second error signal E2 according to the determination result. Thus, deterioration of the fuse 31 can be notified, by outputting the second error signal E2 in the case where the fuse 31 has deteriorated due to ageing.

(3) The control circuit 41 determines the state of the fuse 31 based on the first terminal voltage V1 and the second terminal voltage V2, and, in the case where it is determined that the fuse 31 is broken, outputs the third error signal E3 and turns on the transistor T1. In this way, it becomes possible to notify breakage of the fuse 31, by outputting the third error signal E3 in the case where it is determined that the fuse 31 is broken. Also, operation of the load that is connected to the fuse 31 can be enabled, by turning on the transistor T1 connected in parallel with the fuse 31.

(4) The control circuit 41 monitors the state of the fuse 31 based on the first terminal voltage V1 and the second terminal voltage V2, after turning on the transistor T1 in the case where it is determined that the fuse 31 is not broken, and, in the case where the overcurrent Ie that flows through the fuse 31 is detected, outputs the fourth error signal E4 after turning off the transistor T1 and blowing out the fuse 31 using the overcurrent. In this way, all of the overcurrent flows through the fuse 31, by turning off the transistor T1 connected in parallel with the fuse 31 in the case where the overcurrent Ie is detected. The fuse 31 is thereby blown and the load is protected from the overcurrent. Also, it becomes possible to easily specify the blown fuse 31, using the fourth error signal that is output.

(5) The fuse box 13 has a current detection unit that detects the current in wiring between the fuse 31 and the power source, and the control circuit 41 determines the state of the fuse 31 based on the first terminal voltage V1, the second terminal voltage V2, and the current value detected by the current detection unit. As a result, the current that flows through the fuse 31 can be detected more accurately by the current detection unit.

The following changes can also be made to the above embodiment.

Figure 4:
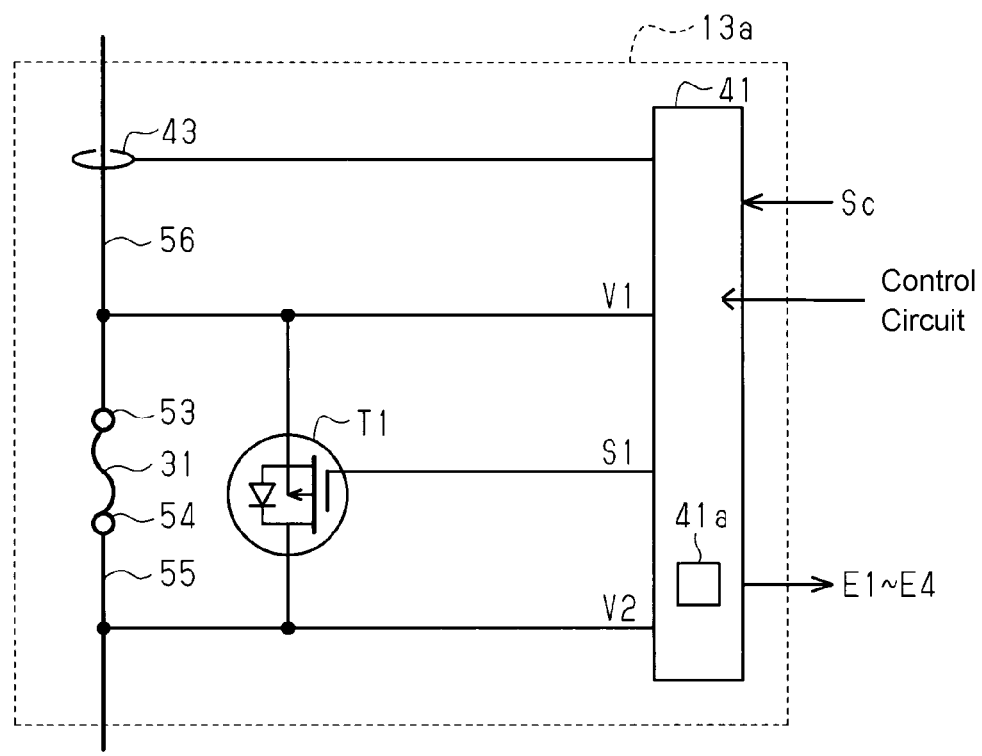
FIG. 4 is a schematic configuration diagram of an electrical junction box of another embodiment.

Although, in the above embodiment, the current that flows through the fuse 31 is detected using the resistor R1 and the op-amp 42 shown in FIG. 2, the current detection method is not limited to the above configuration. For example, a fuse box 13a shown in FIG. 4 has a current sensor 43 that detects the current that flows through wiring 56 that is connected to the connection terminal 53. The current that flows through the fuse 31 may be detected using this current sensor 43. The current sensor 43 is a Hall element, for example.

Determination of the state of the fuse 31 may be performed using only the terminal voltages V1 and V2 at the two terminals of the fuse 31, without using the current value If in the fuse 31. For example, whether the fuse 31 is broken is determined by the voltage difference between the terminal voltages V1 and V2.

The amount of current that flows through the load 14 shown in FIG. 1 at each time of startup is substantially constant. Thus, the potential difference between the two terminals of the fuse 31 corresponds (is proportionate) to the resistance value of the fuse 31. The difference voltage of the terminal voltages V1 and V2 at the two terminals of the fuse 31 at the time of shipment is stored in the memory 41a of the control circuit 41 as the standard resistance value. Also, a difference voltage that depends on the ageing characteristics of the fuse 31 is stored in the memory 41a as the amount of change in the resistance value. The control circuit 41 compares the difference voltage of the terminal voltages V1 and V2 at the time of startup with the reference value calculated based on the standard resistance value and the amount of change, and determines the state (correctness, deterioration, breakage, overcurrent) of the mounted fuse, according to the comparison result. The control circuit 41 outputs the error signals E1 to E4 based on the determination result.

By performing the determination in this manner, it becomes possible to omit members that are for detecting current (resistor R1 and op-amp 42 shown in FIG. 1). Costs related to the fuse box (electrical junction box) can thereby be suppressed.

The transistor T1 serving as a switch is not limited to a field effect transistor (FET). For example, a semiconductor switch such as an insulated-gate bipolar transistor (IGBT) may be used. Also, a mechanical switch such as a relay (e.g., electromagnetic relay) may be used as the switch.

Control circuits similar to the abovementioned control circuit 41 may also be provided to the other fuses 32 to 34 that are included in the fuse box 13, not only to the fuse 31.

The foregoing embodiments are intended to be illustrative, and the invention is not limited to those embodiments. Various substitutions, changes and modifications can be made to the disclosed illustrative embodiments without departing from the spirit and scope of the invention. For example, the subject matter of the invention may be present in fewer than all of the features disclosed in specific embodiments. Therefore, the claims are incorporated in the detailed description, and each claim itself supports a separate embodiment. The scope of the invention is intended to embrace all forms of such substitutions, changes and modifications in the claims, together with all equivalents thereof.

The invention claimed is:

1. An electrical junction box comprising:
a switch connected between a first connection terminal and a second connection terminal to which a fuse is mounted; and
a control circuit that is configured to perform opening/closing control of the switch, has a storage unit for storing a standard resistance value in an initial state of the fuse and an amount of change in a resistance value of the fuse over time, and detects a first terminal voltage at the first connection terminal and a second terminal voltage at the second connection terminal,
wherein the control circuit opens the switch at a time of startup based on a control signal to the control circuit, calculates the resistance value of the fuse based on the first terminal voltage and the second terminal voltage, calculates a reference resistance value based on the standard resistance value and the amount of change, determines whether the fuse is correct by comparing the calculated resistance value of the fuse with the calculated reference resistance value, and outputs a first error signal if it is determined that the fuse is incorrect.

2. The electrical junction box according to claim 1, wherein the control circuit determines whether the fuse is deteriorated by comparing the calculated resistance value of the fuse with the calculated reference resistance value, and outputs a second error signal according to a result of the determination.

3. The electrical junction box according to claim 1, wherein the control circuit determines a state of the fuse based on the first terminal voltage and the second terminal voltage, and outputs a third error signal and closes the switch if it is determined that the fuse is broken.

4. The electrical junction box according to claim 1, wherein the control circuit closes the switch if it is determined that the fuse is not broken, and monitors the state of the fuse based on the first terminal voltage and the second terminal voltage, and, if an overcurrent that flows through the fuse is detected, opens the switch to blow the fuse using the overcurrent, and outputs a fourth error signal.

5. The electrical junction box according to claim 1, comprising:
a current detection unit that detects a current in wiring between the fuse and a power source, wherein the control circuit determines the state of the fuse based on the first terminal voltage, the second terminal voltage, and a current value detected by the current detection unit.

6. The electrical junction box according to claim 2, wherein the control circuit determines a state of the fuse based on the first terminal voltage and the second terminal voltage, and outputs a third error signal and closes the switch if it is determined that the fuse is broken.

7. The electrical junction box according to claim 2, wherein the control circuit closes the switch if it is determined that the fuse is not broken, and monitors the state of the fuse based on the first terminal voltage and the second terminal voltage, and, if an overcurrent that flows through the fuse is detected, opens the switch to blow the fuse using the overcurrent, and outputs a fourth error signal.

8. The electrical junction box according to claim 3, wherein the control circuit closes the switch if it is determined that the fuse is not broken, and monitors the state of the fuse based on the first terminal voltage and the second terminal voltage, and, if an overcurrent that flows through the fuse is detected, opens the switch to blow the fuse using the overcurrent, and outputs a fourth error signal.

9. The electrical junction box according to claim 2, comprising:
a current detection unit that detects a current in wiring between the fuse and a power source, wherein the control circuit determines the state of the fuse based on the first terminal voltage, the second terminal voltage, and a current value detected by the current detection unit.

10. The electrical junction box according to claim 3, comprising:
a current detection unit that detects a current in wiring between the fuse and a power source, wherein the control circuit determines the state of the fuse based on the first terminal voltage, the second terminal voltage, and a current value detected by the current detection unit.

11. The electrical junction box according to claim 4, comprising:
a current detection unit that detects a current in wiring between the fuse and a power source, wherein the control circuit determines the state of the fuse based on the first terminal voltage, the second terminal voltage, and a current value detected by the current detection unit.

* * * * *